(12) United States Patent
Feng et al.

(10) Patent No.: US 11,512,741 B2
(45) Date of Patent: Nov. 29, 2022

(54) PACKAGING SLEEVE

(71) Applicant: AKTIEBOLAGET SKF, Gothenburg (SE)

(72) Inventors: Junhong Feng, Fair Lawn, NJ (US); Harald Metz, Randersacker (DE)

(73) Assignee: AKTIEBOLAGET SKF, Gothenburg (SE)

( * ) Notice: Subject to any disclaimer, the term of this patent is extended or adjusted under 35 U.S.C. 154(b) by 27 days.

(21) Appl. No.: 17/165,204

(22) Filed: Feb. 2, 2021

(65) Prior Publication Data
US 2022/0243766 A1     Aug. 4, 2022

(51) Int. Cl.
*F16C 41/04*     (2006.01)
*F16C 43/04*     (2006.01)

(52) U.S. Cl.
CPC .............. *F16C 41/04* (2013.01); *F16C 43/04* (2013.01)

(58) Field of Classification Search
CPC ......... F16C 41/04; F16C 41/045; F16C 43/04
See application file for complete search history.

(56) References Cited

U.S. PATENT DOCUMENTS

| | | | |
|---|---|---|---|
| 2,312,615 A * | 3/1943 | Allen | F16C 43/08 |
| | | | 29/434 |
| 6,550,972 B1 * | 4/2003 | Adolph | F16C 41/045 |
| | | | 384/909 |

FOREIGN PATENT DOCUMENTS

| | | | |
|---|---|---|---|
| DE | 2815078 | * | 10/1979 |
| DE | 4126940 | * | 2/1993 |
| DE | 102007009864 | * | 9/2008 |
| JP | 2523184 | * | 10/1996 |
| JP | 2979503 | * | 9/1999 |
| WO | WO2012084279 | * | 6/2012 |

OTHER PUBLICATIONS

Translation of DE2815078 obtained Apr. 26, 2022.*

* cited by examiner

*Primary Examiner* — James Pilkington

(74) *Attorney, Agent, or Firm* — J-TEK Law PLLC; Scott T. Wakeman; Mark A. Ussai

(57) ABSTRACT

Disclosed is a packaging sleeve for a full complement needle roller bearing, wherein the packing sleeve is adapted to accommodate at least one set of needles of a full complement needle roller bearing, and wherein the packaging sleeve comprises an outer cylindrical sleeve, wherein a shoulder is arranged on an inner surface of the outer cylindrical sleeve so that the set of needles abut against the shoulder when being arranged in the outer cylindrical sleeve. Furthermore, a packaging sleeve arrangement including such a packaging sleeve and a method for mounting a packaging sleeve are disclosed.

5 Claims, 3 Drawing Sheets

Figure 1:
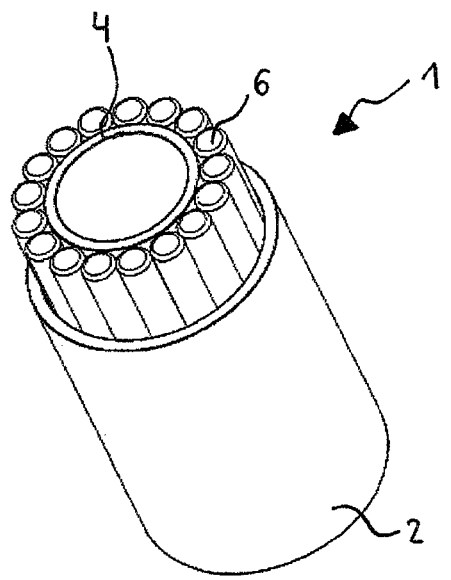

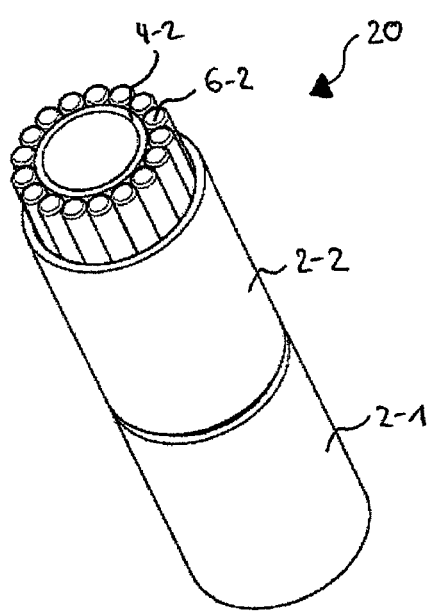
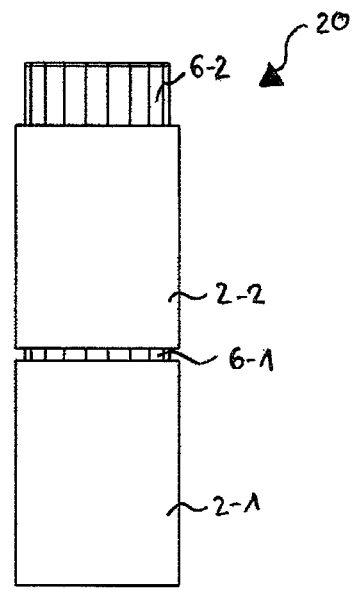
Fig. 4	Fig. 5
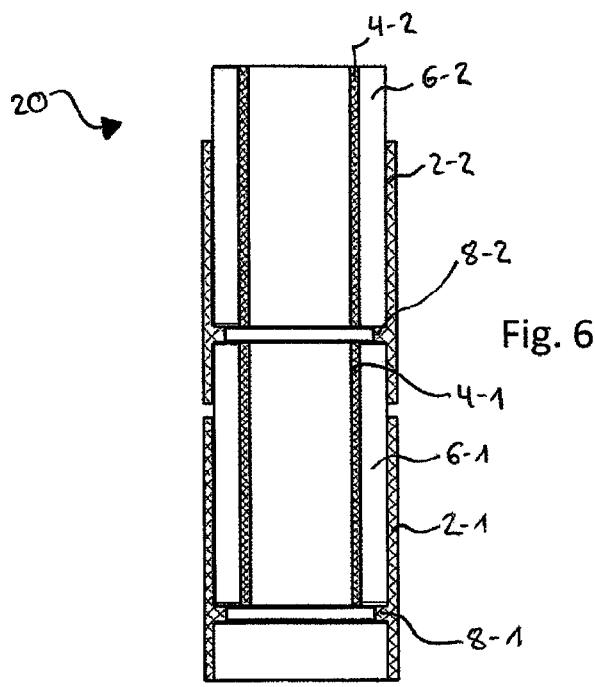
Fig. 6

PACKAGING SLEEVE

BACKGROUND OF THE INVENTION

The present invention relates to needle roller bearings, and more particularly to a packaging sleeve for a full complement needle roller bearing.

When transporting full complement needle roller bearings, which consist of at least one set of needles, two or more bearings may be stacked together. During transport, it is necessary to ensure that the needles are not damaged or get lost. For this purpose, the full complement needle roller bearings may be arranged within a cylindrical sleeve which substitutes the outer ring of the full complement needle roller bearing. However, for mounting the bearings in their final position, the needles need to be removed from the sleeve which may be difficult without losing any of the needles. Further, the needles need to be secured by any fixing means to not fall out of the sleeve.

SUMMARY OF THE INVENTION

It is therefore object of the present invention to provide a packaging sleeve for facilitating the transport and mounting of a full complement needle roller bearing.

In one aspect, the present invention is a packaging sleeve arrangement for a full complement needle roller bearing, the packaging sleeve arrangement being adapted to accommodate two single row full complement needle roller bearings or two double row full complement needle roller bearings. The packaging sleeve arrangement comprises a first packaging sleeve including an outer cylindrical sleeve, a shoulder being arranged on an inner surface of the outer cylindrical sleeve so that a first set of needles abut against the shoulder when being arranged in the outer cylindrical sleeve, the needles projecting from the outer cylindrical sleeve. A second packaging sleeve includes an outer cylindrical sleeve, a shoulder being arranged on an inner surface of the outer cylindrical sleeve so that a second set of needles abut against the shoulder when being arranged in the outer cylindrical sleeve. The shoulder is arranged at an axial position displaced from one end of the cylindrical sleeve towards the other end of the sleeve to provide first and second portions of the cylindrical sleeve. The projecting part of a first set of needles, which is arranged in the first packaging sleeve, is arranged in the second portion of the outer cylindrical sleeve of the second packaging sleeve.

The packaging sleeve can be used for transporting a full complement needle roller bearing. In particular, the packing sleeve is adapted to accommodate a single row or a double row full complement needle roller bearing. Such a full complement needle roller bearing consists of at least one set of needles which will be arranged between an outer and an inner race when assembled at the final position, for example in a gear box. During transport, the packaging sleeve substitutes at least the outer race or outer ring of the final full complement needle roller bearing.

To accommodate the at least one set of needles of the full complement needle roller bearing, the packaging sleeve comprises an outer cylindrical sleeve, in which the needles can be arranged. The outer cylindrical sleeve, which substitutes the outer ring or race of the final full complement needle roller bearing during transport, comprises a shoulder being arranged on an inner surface of the outer cylindrical sleeve so that the set of needles abut against the shoulder when being arranged in the outer cylindrical sleeve. Due to this shoulder, the needles cannot fall out of the outer cylindrical sleeve as they abut against the shoulder and are thus hold within the outer cylindrical sleeve. No further fixing means are required.

The packaging sleeve may be made for example from plastic materials, such as low-density polyethylene (LDPE), high-density polyethylene (HDPE), polypropylene (PP), polyethylene (PE), acrylonitrile butadiene styrene (ABS) etc. with or without additives.

According to a further embodiment, at least one set of needles, i.e., one single row full complement needle roller bearing, is arrangeable in the outer cylindrical sleeve such that the needles project from the outer cylindrical sleeve. The projecting part of the needles may be inserted into an outer race, for example a housing, a gear, or any kind of outer ring, while they are still hold by the cylindrical outer sleeve, providing an easy way of mounting the needles. During insertion of the needles, the shoulder of the outer cylindrical sleeve provides a means for applying a force to the needles to be pushed into the outer race. Afterwards, the needles may completely be inserted into the outer race and the outer cylindrical sleeve may be removed.

The shoulder may be arranged at an axial position being displaced from one end of the outer cylindrical sleeve towards the other end of the outer cylindrical sleeve providing a first and a second portion of the outer cylindrical sleeve.

The first portion may be longer than the second portion. This is particularly suitable when two or more packaging sleeves are stacked together for a packaging sleeve arrangement. In this case, one full complement needle roller bearing is arranged in the first portion, projecting from the cylindrical outer sleeve. The projecting part of a second full complement needle roller bearing may be arranged in the portion of a further packaging sleeve of a first full complement needle roller bearing. By this, an arbitrary amount of packaging sleeves may be stacked together, each packaging sleeve accommodating a full complement needle roller bearing.

The needles may be arranged between the outer cylindrical sleeve and an inner race, for example an inner ring, shaft, or axle bolt, of the final needle roller bearing. Thus, the inner race may be mounted together with the set of needles into an outer race.

Alternatively, the packaging sleeve may further comprise an inner cylindrical sleeve, wherein the set of needles is arrangeable between the inner cylindrical sleeve and the outer cylindrical sleeve. In this case, the inner cylindrical sleeve may be used for transport and mounting the set of needles, substituting the inner race of the final bearing, and may be removed after installation in the housing or outer ring.

In contrast to the outer cylindrical sleeve, the end of the inner cylindrical sleeve is flushed with the ends of needles for a single-row or with outer end of needles for a double-row full complement needle roller bearing. Alternatively, the end of the inner cylindrical sleeve is recessed in relation to the ends of needles for a single-row or with outer end of needles for a double-row full complement needle roller bearing. Thus, the end of the needles projecting from the outer cylindrical sleeve may be stabilized by the inner cylindrical sleeve. During installation, the inner cylindrical sleeve at first remains while the outer cylindrical sleeve is removed as explained above. Afterwards, an inner ring or axle bolt may be inserted between the needles, pressing the inner cylindrical sleeve out.

According to a further aspect, a packaging sleeve arrangement is disclosed which comprises at least a first and a second packaging sleeve as described above for accommodating at least two sets of needles of full complement needle roller bearings.

In such a packaging sleeve arrangement, the projecting part of a set of needles arranged in the first portion of the outer cylindrical sleeve of the first packaging sleeve is arranged in the second portion of the outer cylindrical sleeve of the second packaging sleeve. In this way, a plurality of packaging sleeves may be combined as also described above.

According to a further aspect, a method for mounting a full complement needle roller bearing above into a gear box, in particular into a planetary gear box, is disclosed. The set of needles of the full complement needle roller bearing is arranged in a packaging sleeve as described. The method comprises the following steps: arranging a packaging sleeve at an outer race, for example an outer ring, housing or gear, the packaging sleeve including the set of needles being arranged in an outer sleeve, wherein the set of needles project from the outer sleeve, pushing the set of needles in the outer race, and removing the outer sleeve.

The packaging sleeve may be inserted into an outer race, in particular an outer ring or housing, wherein first the projecting part of the needles is inserted into the outer race. During this, the shoulder of the outer cylindrical sleeve may serve as an abutment element for applying a force onto the needles for pushing them into the outer race. Then, the needles may be further pushed into the outer race until the needles are completely received in the outer race and the outer cylindrical sleeve may be removed.

According to an embodiment, the packaging sleeve comprises an inner cylindrical sleeve and the method further comprises pushing an inner race, for example an inner ring, shaft, or an axle bolt, into the bearing so that the inner cylindrical sleeve is pushed out.

In this case, after insertion of the needles in the outer race and removal of the outer cylindrical sleeve, the inner race may be inserted at the position of the inner cylindrical sleeve, pushing the sleeve out. This provides an easy way for switching the inner cylindrical sleeve of the packaging sleeve with the inner race of the final needle roller bearing, without a risk to lose any needles during the installation of the set of needles.

Further preferred embodiments are defined in the dependent claims as well as in the description and the figures. Thereby, elements described or shown in combination with other elements may be present alone or in combination with other elements without departing from the scope of protection.

In the following, preferred embodiments of the invention are described in relation to the drawings, wherein the drawings are exemplarily only, and are not intended to limit the scope of protection. The scope of protection is defined by the accompanied claims, only.

BRIEF DESCRIPTION OF THE SEVERAL VIEWS OF THE DRAWING(S)

Figure 2:
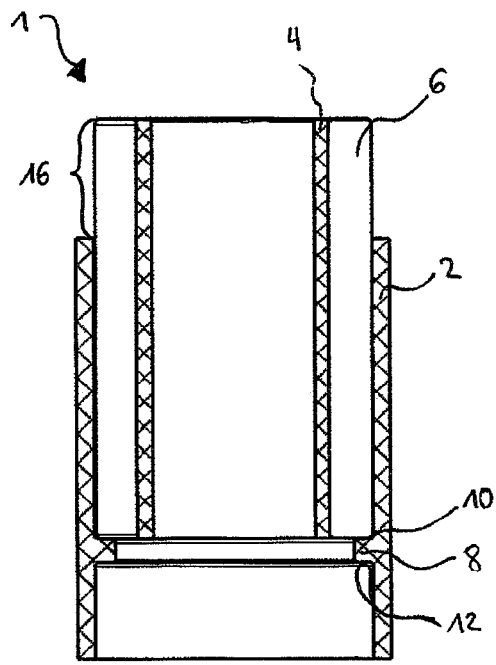
Figure 3:
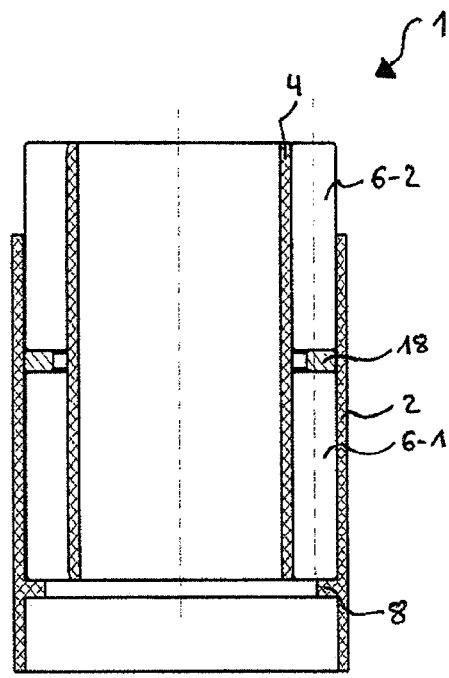

The figures show:

FIG. 1: a perspective view of a packaging sleeve for a full complement needle roller bear-mg;

FIG. 2: a sectional view of the packaging sleeve of FIG. 1 in a first embodiment;

FIG. 3: a sectional view of the packaging sleeve of FIG. 1 in a second embodiment;

FIG. 4: a perspective view of a packaging sleeve arrangement comprising two packaging sleeves of FIG. 1;

FIG. 5: a side view of the packaging sleeve arrangement of FIG. 4;

FIG. 6: a sectional view of the packaging sleeve arrangement of FIG. 4; and

Figure 7:
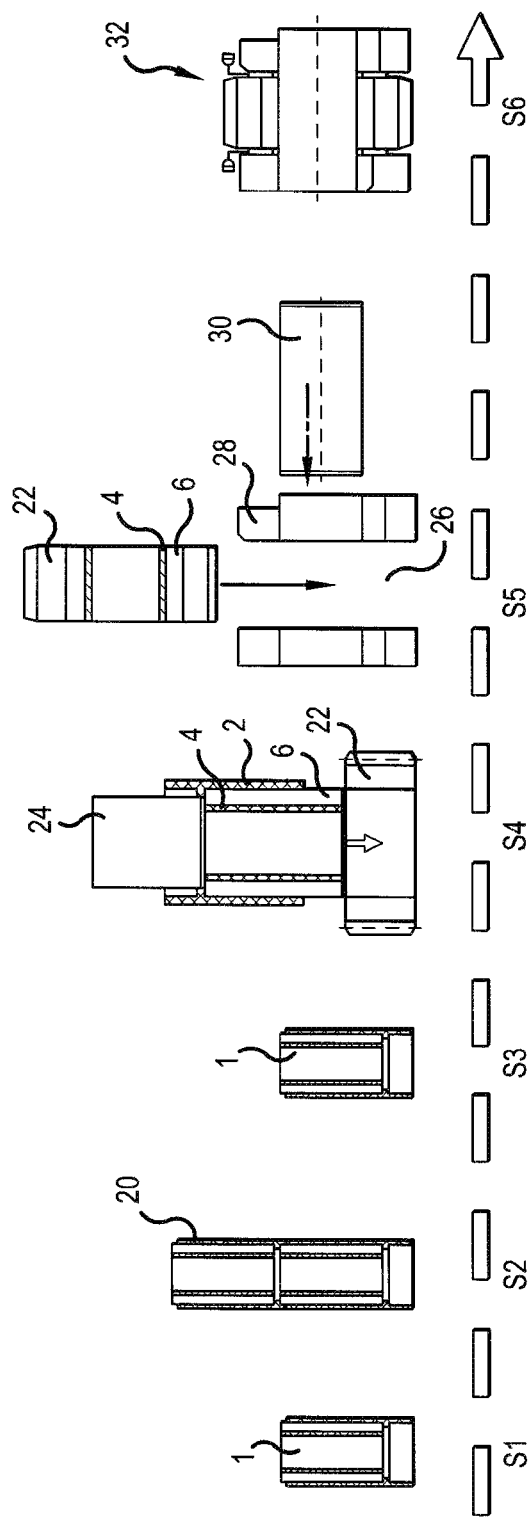

FIG. 7: a method for mounting the packaging sleeve of FIG. 1.

DETAILED DESCRIPTION OF THE INVENTION

In the following same or similar functioning elements are indicated with the same reference numerals.

FIGS. 1 to 3 show a packaging sleeve 1 for a full complement needle roller bearing. The packaging sleeve 1 comprises an outer cylindrical sleeve 2 and an inner cylindrical sleeve 4, wherein a set of needles 6 for a full complement needle roller bearing are arranged between the outer cylindrical sleeve 2 and the inner cylindrical sleeve 4. The outer cylindrical sleeve 2 and the inner cylindrical sleeve 4 substitute the outer race and the inner race of the final full complement needle roller bearing.

It should be noted that the inner cylindrical sleeve 4 may be either a sleeve used only during transport and installation of the needles 6 in a bearing or may already be the inner race, for example inner ring, shaft, or axle bolt, of the bearing. Further, the inner cylindrical sleeve 4 may be a hollow sleeve or may be a solid tube.

The outer cylindrical sleeve 2 comprises a shoulder 8. The set of needles 6 abuts against the shoulder 8 at a contact face 10 and can thus not fall out of the packaging sleeve 1. The shoulder 8 is circumferentially provided at an inner surface of the outer cylindrical sleeve 2. On the other side 12 of the shoulder 8, a further set 14 of needles 6 of another packaging sleeve 1 may be arranged which will be described with reference to FIGS. 4 to 6.

As can be seen in FIGS. 1 to 3, the shoulder 8 is arranged at an axial position being displaced from one end of the outer cylindrical sleeve 2 towards the other end of the outer cylindrical sleeve 2 such that the set of needles 6 project from the outer cylindrical sleeve 2. The projecting part 16 of the needles 6 may be inserted into an outer race, for example a housing, a gear, or any kind of outer ring, while they are still hold by the cylindrical outer sleeve 2 which will be described in greater detail with reference to FIG. 7.

In FIG. 2, only one set of needles 6 is accommodated in the outer cylindrical sleeve 2. Alternatively, as shown in FIG. 3, also two sets of needles 6 may be accommodated in the outer cylindrical sleeve 2 in combination with one inner cylindrical sleeve 4. In this case, the first set of needles 6-1 will abut on the shoulder 8 and the second set of needles 6-2 will be arranged adjacently and will project from the outer cylindrical sleeve 2. For two set of needles, a washer 18 is arranged between the needles 6-1 and 6-2. The washer 18 may consist of steel or the like.

For transport of the packaging sleeve 1, two or more packaging sleeves 1 can be combined in a packaging sleeve arrangement 20 as shown in FIGS. 4 to 6.

Each packaging sleeve 1 has its own inner cylindrical sleeve 4-1, 4-2 and its own outer cylindrical sleeve 2-1, 2-2 between which a set of needles 6-1, 6-2 is arranged.

As can be seen, the set of needles 6-1 of the first packaging sleeve 1 projects from the outer cylindrical sleeve 2-1 and is arranged in the outer cylindrical sleeve 2-2. Due to this arrangement, the two packaging sleeves 1 are stacked on each other and can be transported as one arrangement 20. Also, one or more further packaging sleeves (none shown) can be added.

For installation, the packaging sleeves 1 may be separated and the sets of needles 6-1, 6-2 may be mounted, which will be explained in the following with reference to FIG. 7.

FIG. 7 shows a method for mounting the packaging sleeve 1.

In a first step S1, a packaging sleeve 1 is provided as described above. Optionally, the packaging sleeve 1 may be combined with one or more further packaging sleeves 1 into a packaging sleeve arrangement 20 for transport in step S2.

For mounting the needles 6, the packaging arrangement 20 may be separated into several packaging sleeves 1 in step S3.

When mounting the needles 6 into their final position, for example in a planetary carrier 28, the projecting part 16 of the needles 6 is inserted into an outer race, in this case a planetary gear 22 in step S4. Then, the needles 6 together with the inner cylindrical sleeve 4 are pushed into the planetary gear 22 using a pushing tool 24. During this, the needles 6 are pushed from the outer cylindrical sleeve 2 into the planetary gear 22.

In step S5, the planetary gear 22, the needles 6 and the inner cylindrical sleeve 4 are arranged in a free space 26 of the planetary carrier 28. Then, a planetary shaft 30 is moved in between the needles 6, pushing and removing the inner cylindrical sleeve 4. Thus, the inner cylindrical sleeve 4 is switched with the planetary shaft 30 being the inner race. This mounting procedure results in a full complement needle roller bearing 32 in step S6.

In summary, the packaging sleeve 1 provides an easy way of transporting and mounting a set of needles for a full complement needle roller bearing without a risk of losing any needles during the transport and installation of the needles.

REFERENCE NUMERALS

1 packaging sleeve
2 outer cylindrical sleeve
4 inner cylindrical sleeve
6 set of needles
8 shoulder
10 contact face
12 contact face
14 further packaging sleeve
16 projecting part
18 washer
20 packaging sleeve arrangement
22 planetary gear
24 pushing tool
26 free space
28 planetary carrier
30 planetary shaft
32 full complement needle roller bearing

The invention claimed is:

1. A packaging sleeve arrangement for a full complement needle roller bearing, the packaging sleeve arrangement being adapted to accommodate two single row full complement needle roller bearings or two double row full complement needle roller bearings, the packaging sleeve arrangement comprising:

a first packaging sleeve including an outer cylindrical sleeve, wherein a shoulder is arranged on an inner surface of the outer cylindrical sleeve so that a first set of needles abut against the shoulder when being arranged in the outer cylindrical sleeve, a part of the first set of needles projecting from the outer cylindrical sleeve; and a second packaging sleeve including an outer cylindrical sleeve, wherein a shoulder is arranged on an inner surface of the outer cylindrical sleeve so that a second set of needles abut against the shoulder when arranged in the outer cylindrical sleeve, the shoulder being arranged at an axial position displaced from one end of the cylindrical sleeve towards the other end of the sleeve to provide first and second portions of the cylindrical sleeve;

wherein the projecting part of the first set of needles is arranged in the second portion of the outer cylindrical sleeve of the second packaging sleeve.

2. The packaging sleeve arrangement according to claim 1, wherein the first portion of the second packaging sleeve is longer than the second portion of the second packaging sleeve.

3. The packaging sleeve arrangement according to claim 1, wherein at least one of the first packaging sleeve and the second packaging sleeve further includes an inner cylindrical sleeve, wherein the set of needles of the at least one of the first packaging sleeve and the second packaging sleeve are arrangeable between the inner cylindrical sleeve and the outer cylindrical sleeve.

4. The packaging sleeve arrangement according to claim 3, wherein an end of the inner cylindrical sleeve is flush or recessed in relation to the ends of needles.

5. A packaging sleeve for a full complement needle roller bearing, the packaging sleeve being adapted to accommodate at least one set of needles of the full complement needle roller bearing, the packaging sleeve comprising:

an outer cylindrical sleeve having an integral shoulder projecting from the inner surface of the outer cylindrical sleeve, the shoulder being displaced from axial ends of the outer cylindrical sleeve and the shoulder having an inside diameter;

a set of needles disposed within the outer cylindrical sleeve so as to abut against the shoulder; and an inner cylindrical sleeve disposed within the outer cylindrical sleeve such that the set of needles is arranged between the inner cylindrical sleeve and the outer cylindrical sleeve, the inner cylindrical sleeve having an outside diameter less than the inside diameter of the shoulder of the outer cylindrical sleeve such that the inner cylindrical sleeve is displaceable outwardly from the outer cylindrical sleeve in either axial direction.

\* \* \* \* \*